United States Patent
Danikhno et al.

(10) Patent No.: US 10,108,793 B2
(45) Date of Patent: Oct. 23, 2018

(54) SYSTEMS AND METHODS FOR SECURE BIOMETRIC PROCESSING

(71) Applicant: Delta ID Inc., Fremont, CA (US)

(72) Inventors: Oleksiy Danikhno, Mountain View, CA (US); Alexander Ivanisov, Newark, CA (US); Salil Prabhakar, Fremont, CA (US)

(73) Assignee: Delta ID Inc., Fremont, CA (US)

( * ) Notice: Subject to any disclaimer, the term of this patent is extended or adjusted under 35 U.S.C. 154(b) by 430 days.

(21) Appl. No.: 14/716,069

(22) Filed: May 19, 2015

(65) Prior Publication Data

US 2016/0125240 A1 May 5, 2016

Related U.S. Application Data

(63) Continuation-in-part of application No. 14/527,918, filed on Oct. 30, 2014.

(51) Int. Cl.
*G06F 21/32* (2013.01)
*G06F 21/36* (2013.01)
(Continued)

(52) U.S. Cl.
CPC ......... *G06F 21/32* (2013.01); *G06K 9/00597* (2013.01); *G06K 9/00912* (2013.01); *G06F 17/30247* (2013.01); *G06F 17/30256* (2013.01); *G06F 21/36* (2013.01); *G06F 21/606* (2013.01); *G06F 2221/2149* (2013.01); *G06K 9/00006* (2013.01); *G06K 9/0061* (2013.01);
(Continued)

(58) Field of Classification Search
None
See application file for complete search history.

(56) References Cited

U.S. PATENT DOCUMENTS

| 2012/0242820 A1 | 9/2012 | Hanna et al. |
| 2013/0167212 A1 | 6/2013 | Azar et al. |

(Continued)

FOREIGN PATENT DOCUMENTS

| WO | 2012098352 A2 | 7/2012 |
| WO | 2014113728 A1 | 7/2014 |

OTHER PUBLICATIONS

International Search Report and Written Opinion for Application No. PCT/US2015/058029 dated Jan. 19, 2016.

*Primary Examiner* — Joseph G Ustaris
*Assistant Examiner* — William Adrovel
(74) *Attorney, Agent, or Firm* — Lerner, David, Littenberg, Krumholz & Mentlik, LLP

(57) ABSTRACT

The invention provides methods, systems and computer program products for secure biometric image processing. The invention involves acquiring a first image of a first field of view corresponding to a biometric camera. A first set of image information defining the first image is received at a processor implemented first high security operating environment, which first set of image information includes a second sub-set of image information relevant for biometric feature extraction or comparison. A second image of the first field of view corresponding to the biometric camera is rendered on a display, which second image is defined by a third set of image information such that the third set of information excludes the second sub-set of image information.

4 Claims, 11 Drawing Sheets

(51) Int. Cl.
  *G06F 21/60* (2013.01)
  *G06F 17/30* (2006.01)
  *G06K 9/00* (2006.01)
  *G06K 9/20* (2006.01)
  *G06T 7/11* (2017.01)
  *G06T 7/60* (2017.01)
  *G06Q 20/40* (2012.01)
  *H04N 5/232* (2006.01)
  *H04N 21/41* (2011.01)
  *H04L 9/08* (2006.01)
  *H04L 29/06* (2006.01)
  *H04W 12/02* (2009.01)
  *H04W 12/04* (2009.01)
  *H04L 9/32* (2006.01)

(52) U.S. Cl.
  CPC ..... *G06K 9/00288* (2013.01); *G06K 9/00604* (2013.01); *G06K 9/00617* (2013.01); *G06K 9/00892* (2013.01); *G06K 2009/00953* (2013.01); *G06Q 20/401* (2013.01); *G06Q 20/40145* (2013.01); *G06T 7/11* (2017.01); *G06T 7/60* (2013.01); *G06T 2207/20224* (2013.01); *G06T 2207/30041* (2013.01); *H04L 9/0866* (2013.01); *H04L 9/3231* (2013.01); *H04L 63/0428* (2013.01); *H04L 63/0861* (2013.01); *H04N 5/23219* (2013.01); *H04N 5/23293* (2013.01); *H04N 5/23296* (2013.01); *H04N 21/4126* (2013.01); *H04W 12/02* (2013.01); *H04W 12/04* (2013.01)

(56) References Cited

U.S. PATENT DOCUMENTS

| | | |
|---|---|---|
| 2014/0283113 A1 | 9/2014 | Hanna |
| 2016/0012218 A1 | 1/2016 | Perna et al. |
| 2016/0019421 A1 | 1/2016 | Feng et al. |
| 2016/0048670 A1* | 2/2016 | Kim .............. G06K 9/00073 382/117 |
| 2016/0117544 A1* | 4/2016 | Hoyos ............ H04N 5/23219 348/78 |

* cited by examiner

SYSTEMS AND METHODS FOR SECURE BIOMETRIC PROCESSING

CROSS-REFERENCE TO RELATED APPLICATIONS

The present application is a continuation-in-part of U.S. patent application Ser. No. 14/527,918, filed Oct. 30, 2014, the disclosure of which is incorporated herein by reference.

FIELD OF INVENTION

The invention relates to systems and methods for secure processing of images for biometric recognition.

BACKGROUND

Methods for biometric based identification or authentication implement pattern-recognition techniques to compare acquired biometric features or identifiers against previously recorded biometric features or identifiers, to determine or verify identity of a subject. A digital feature set corresponding to an acquired biometric feature or identifier is encoded based on acquired feature or identifier, using mathematical or statistical algorithms. The digital feature set or template is compared with databases of previously encoded digital templates (stored feature sets corresponding to previously acquired biometric features or identifiers), for locating a match and determining or verifying identity of the subject.

Biometric identifiers may comprise one or more physiological characteristics that are uniquely associated with an individual—such as for example, fingerprints, palm vein characteristics, facial characteristics, DNA patterns, palm print characteristics, iris or retina patterns, eye vein, periocular and odour/scent characteristics.

Systems for biometric based recognition ordinarily comprise one or more sensors for detecting or recording biometric features or identifiers, and a processing apparatus for encoding the acquired biometric features or identifiers and for comparing the encoded features or identifiers against databases of previously encoded features or identifiers that have been stored as digital templates. For example, systems for iris recognition comprise an imaging apparatus for capturing an image of a subject's iris(es) and an image processing apparatus for encoding and comparing the captured image information against previously stored iris image information. The imaging apparatus and image processing apparatus may comprise separate devices, or may be combined within a single device.

While biometric recognition systems have been previously available as dedicated devices, it is increasingly desirable to incorporate biometric recognition capabilities into multi-capability devices having inbuilt sensors or cameras, including electronic devices, computing devices, handheld devices or mobile devices such as mobile communication devices or mobile computing devices, such as for example, mobile phones, smart phones, personal digital assistants, tablets, laptops, wearable computing devices or even automobiles, or automotive components and accessories having inbuilt cameras.

Although use of such devices for biometric recognition or authentication is convenient and cost-effective, unsecured processing of information recorded by sensors within such devices presents serious security concerns and potential for identity theft.

A first security concern arises from the threat of viruses, malware or other malicious software which may be present within a device and may be used to misappropriate biometric information—such as images of a biometric feature corresponding to a subject, or biometric feature information extracted from such images, or digital feature sets encoded based on such images, which misappropriated data or information may thereafter be used to impersonate a subject.

A second security concern arises in connection with visual feedback mechanisms implemented within a device for ensuring that the biometric sensors are positioned appropriately relative to a subject, to ensure optimal capture of biometric information.

Since operation of a biometric sensor for capture purposes may be carried out by the subject undergoing biometric identification or authentication, some form of feedback is required to enable the subject to correctly position the device relative to the biometric feature of interest. In the case of iris based biometrics, correct positioning ensures that the subject's iris is appropriately positioned within an iris camera's field of view. Visual feedback for positioning may be provided by displaying (on a display device), real-time or near-real-time images captured by the camera. A subject may adjust the position of the camera/image acquisition device relative to the biometric feature of interest, until an image of the entire biometric feature (or substantially the entire biometric feature) is displayed on the display device—which image display confirms that the biometric feature of interest is positioned appropriately within the camera's field of view. In cases where the image acquisition device is an inbuilt camera within a computer, or within a handheld device, a display screen of the computer or handheld device serves as the display device for displaying images of the biometric feature of interest.

The above method for providing visual feedback for correct positioning of a feature of interest presents a security risk—since in displaying feedback images, information corresponding to the displayed biometric feature is vulnerable to misappropriation by photographic or video acquisition of the image rendered on the device display.

It is therefore an objective of the present invention to provide secure methods and systems for biometric feature acquisition and processing.

SUMMARY

The invention provides methods, systems and computer program products for secure biometric processing.

The method for secure biometric processing in accordance with the present invention involves acquiring a first image of a first field of view corresponding to a biometric camera. A first set of image information defining the first image is received at a processor implemented first high security operating environment, which first set of image information includes a second sub-set of image information relevant for biometric feature extraction and/or comparison. A second image of the first field of view corresponding to the biometric camera is rendered on a display, which second image is defined by a third set of image information such that the third set of information excludes the second sub-set of image information.

In accordance with the present invention, the third set of information defining the second image may be received at a processor implemented second normal security operating environment, for rendering the second image on the display.

The processor implementing the first high security operating environment may be configured to operate in a first security state, and the processor implementing the second normal security operating environment may be configured to operate in a second security state, such that the first security state is more secure than the second security state.

Responsive to a part of a biometric feature being positioned within the first field of view corresponding to the biometric camera, the second image rendered on the display may include an image of said part of the biometric feature positioned within the first field of view.

In a method embodiment, the third set of image information may be generated by applying at least one image processing function to the first set of image information.

In a particular embodiment of the method, the first image of the first field of view may be acquired by the biometric camera, while the second image may be acquired by a feedback camera having a second field of view—such that at least part of the first field of view intersects at least part of the second field of view. Intersection of the first field of view and the second field of view may define an intended region for positioning of a biometric feature for optimal image capture. The intersection of the first field of view and second field of view may include a region defined by intersection of the first field of view and depth of focus of the biometric camera.

In a specific embodiment of the method, acquisition of the first image and the second image by the biometric camera and the feedback camera respectively is either substantially simultaneous or is separated by a predefined time interval. In another embodiment, the second field of view may be wider than the first field of view.

The biometric camera of the present invention may in an embodiment have improved biometric imaging characteristics in comparison to the feedback camera. The configuration of the biometric camera may differ from configuration of the feedback camera in terms of at least one of pixel resolution, depth of focus, and optical filters.

In an embodiment the biometric camera may be configured to detect image characteristics based on received wavelengths within at least one of the infrared and near infrared spectrums. The feedback camera may be configured to include an optical assembly comprising at least one optical filter for preventing infrared or near infrared wavelengths from being detected by an image sensor.

In a method embodiment of the present invention, the first image is acquired by a biometric camera having a first field of view, and the second image is generated by cropping a third image acquired by a feedback camera having a second field of view—wherein at least part of the first field of view intersects at least part of the second field of view. The cropped image may include image information corresponding to a region defined by intersection of the first field of view and the second field of view.

The invention additionally provides a system for secure biometric image processing. The system comprises a biometric camera, a processor and a display. The biometric camera may be configured to acquire a first image of a first field of view corresponding to the biometric camera. The processor may be configured to implement a first high security operating environment, and to receive at the first high security operating environment, a first set of image information defining the first image, such that the first set of image information includes a second sub-set of image information relevant for biometric feature extraction. The display may be configured for rendering a second image of the first field of view corresponding to the biometric camera—such that the second image is defined by a third set of image information, and the third set of information excludes the second sub-set of image information.

In an embodiment, the third set of information defining the second image may be received at a processor configured to implement a second normal security operating environment, for rendering the second image on the display.

The system of the present invention may further comprise a feedback camera configured to have a second field of view and to acquire the second image, wherein at least part of the first field of view intersects at least part of the second field of view. The biometric camera and the feedback camera may simultaneously acquire the first image and the second image respectively. In an embodiment, the biometric camera may have improved biometric imaging characteristics in comparison to the feedback camera.

In a particular embodiment, configuration of the biometric camera may differ from configuration of the feedback camera in terms of at least one of pixel resolution, depth of focus, and optical filters. The feedback camera may include an optical assembly comprising at least one optical filter for preventing infrared or near infrared wavelengths from being detected by an image sensor.

In an embodiment, the intersection of the first field of view and second field of view may include a region defined by intersection of the first field of view and depth of focus of the biometric camera.

In a specific system embodiment, the processor may be configured to generate the second image by cropping a third image acquired by a feedback camera having a second field of view—such that at least part of the first field of view intersects at least part of the second field of view.

The invention additionally provides a computer program product for secure biometric image processing. The computer program product may comprise a non-transitory computer usable medium having a computer readable program code embodied therein, which computer readable program code comprising instructions for (i) acquiring a first image of a first field of view corresponding to a biometric camera (ii) receiving at a processor implemented first high security operating environment, a first set of image information defining the first image, wherein the first set of image information includes a second sub-set of image information relevant for biometric feature extraction (iii) rendering on a display, a second image of the first field of view corresponding to the biometric camera, wherein the second image is defined by a third set of image information, and wherein the third set of information excludes the second sub-set of image information.

BRIEF DESCRIPTION OF THE ACCOMPANYING DRAWINGS

DETAILED DESCRIPTION

The present invention is directed to secure methods and systems for biometric imaging processing, including in specific instances involving imaging and processing of eye, retina, eye vein, periocular, iris or facial characteristics. In an embodiment, the system of the present invention includes a device having a biometric sensor based recognition system, such as an iris based recognition system, implemented therein.

The methods and systems of the present invention rely on a digital information processing arrangement including two operating environments. A first high security operating environment functions in a secure state and is utilized for services that require enhanced security. A second normal security operating environment functions in a normal state (which is less secure than the secure state) and is utilized for services that do not require enhanced security. For example, in a device comprising a mobile phone, normal security services, such as making a phone call or using entertainment applications may be implemented within the normal security operating environment, whereas high security services such as online credit card transactions or banking transactions may be implemented within the high security operating environment. Preferably the two operating environments are isolated from each other.

The dual operating environments may be implemented based on one or more processors having an architecture configured to implement the secure operating environment and the normal operating environment. The architecture may provide enhanced security features and protection to processor(s) and memory operating within the high security operating environment, and may segregate secure data and normal data to be separately processed by the high security operating environment and the normal security operating environment respectively.

Figure 1:
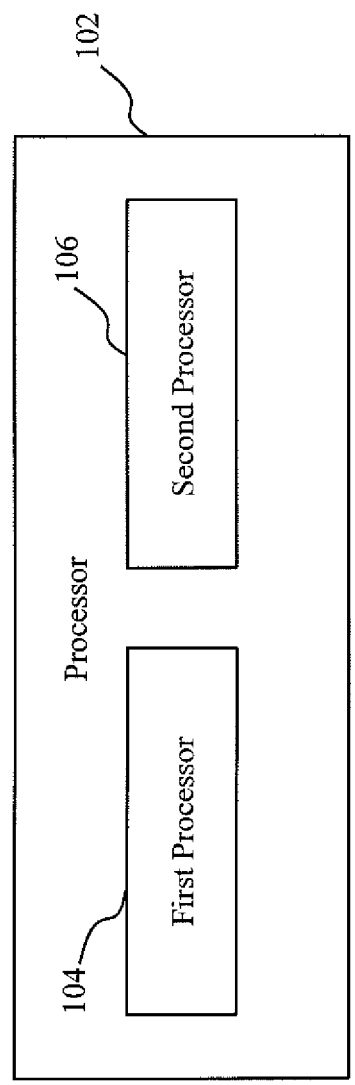
FIG. 1 illustrates an architecture 100 configured to implement two isolated operating environments.

FIG. 1 illustrates an architecture 100 configured to implement two isolated operating environments. The processor 102 may include a first processor 104 for implementing the high security operating environment and a second processor 106 for implementing the normal security operating environment. The first processor 104 may be used to execute services or operations requiring high security, while the second processor 106 may be used to execute services or operations requiring normal security. First processor 104 may additionally be protected from outside access and may also be protected from access or control initiated by second processor 106. It would be understood that the first processor 104 and the second processor 106 may comprise physically separate processors, or alternatively may both comprise logical processing units within a single physical processor. While not illustrated in FIG. 1, it would be understood that the processor 102 (or the first and second processors 104 and 106) may be connected to and may communicate with one or more of memory, storage, input unit(s), output unit(s) and communication interface(s).

TrustZone hardware architecture developed by ARM provides normal security services and high security services using a single physical processor core. To isolate sensitive data from security threats, the single processor core of the TrustZone hardware switches between a normal security state and a high security state to respectively provide a normal operating environment and a secure operating environment in a time-sliced manner, and corresponding hardware resources are design-dedicated to one of the normal security operating environment and the high security operating environment.

The present invention may be implemented based on TrustZone hardware architecture or on any other computer architecture or operating system capable of implementing and maintaining two or more operating environments having respectively differing levels of security, as described above.

While earlier biometric identification methods and systems (such as for example fingerprint based identification) implemented on electronic devices have been known to use TrustZone hardware or other protections in the operating sysem for securing sensitive biometric information, such earlier systems do not address security concerns particular to image based biometric recognition systems that require positioning related visual feedback, such as systems for eye recognition, iris recognition, retina recognition or facial characteristic recognition.

Figure 2:
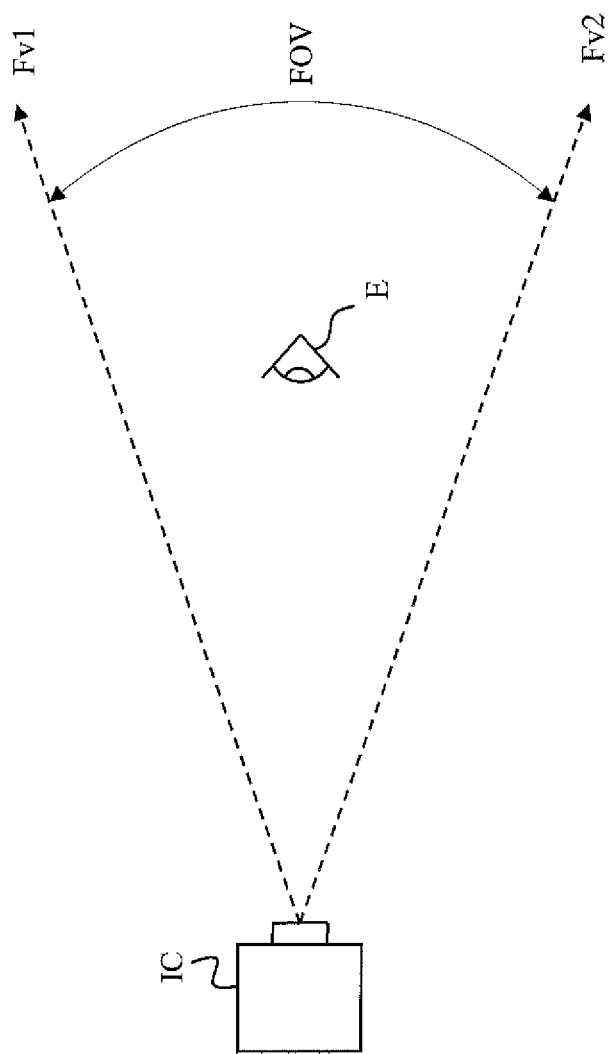
FIG. 2 illustrates a biometric camera having a finite and fixed field of view.

Implementing image based biometric recognition systems in electronic devices requires the biometric feature of interest (e.g. a subject's eye(s), iris, retina or face) to be positioned within a defined field of view of a camera, such that an image comprising all biometric features of interest (or substantially all biometric features of interest) is acquired for feature extraction and comparison. In case of eye based or face based biometric recognition, a subject's eye or face would require to be positioned relative to the camera field of view, such that an image of the entire eye (or region of interest within the eye) or entire face (or region of interest within a face) is acquired for feature extraction and comparison. FIG. 2 illustrates a biometric camera IC having a finite and fixed field of view FOV (i.e. the volume of inspection capable of being captured on the camera's image sensor). In FIG. 2, field of view FOV is the region defined by dashed lines Fv1 and Fv2 and a biometric feature of interest, such as a subject's eye E, requires to be positioned within said field of view FOV to ensure that an image of the entire eye, retina, face or iris is acquired for feature extraction and comparison As discussed above, a device display associated with an imaging apparatus or other camera may be configured to provide visual feedback to enable a subject to position the imaging apparatus correctly so that the biometric feature of interest (e.g. iris, retina, eye or face) is appropriately positioned within the camera field of view. The visual feedback comprises displaying real-time images captured by the camera on the display—thereby enabling an operator or subject to adjust the position of the biometric feature of interest relative to the imaging apparatus until it is positioned appropriately within the imaging apparatus' field of view.

The above configurations for image capture and visual feedback creates security risks—even where image processing apparatuses employ a high security operating environment for image processing. This is for the reason that, in displaying an image of captured biometric features on a display device, information related to biometric characteristics corresponding to the displayed image is communicated beyond the boundaries of the high security operating environment, where it is vulnerable to:

software based attacks and misappropriation, and misappropriation by photographic or video acquisition of the image displayed on the device display The present invention addresses these security concerns by isolating sensitive biometric characteristic related image information (e.g. iris information, eye vein, periocular, retina information or facial characteristic information) within the high security operating environment, while releasing non-sensitive image information to the normal security operating environment and to the display device for visual feedback purposes.

In describing the present invention, FIGS. 3 to 8B discuss multiple embodiments of biometric recognition or authentication systems. It would be understood that these embodiments may be implemented for any image based biometric feature extraction or recognition systems that display images of biometric features or characteristics for the purpose of providing visual feedback.

Figure 3:
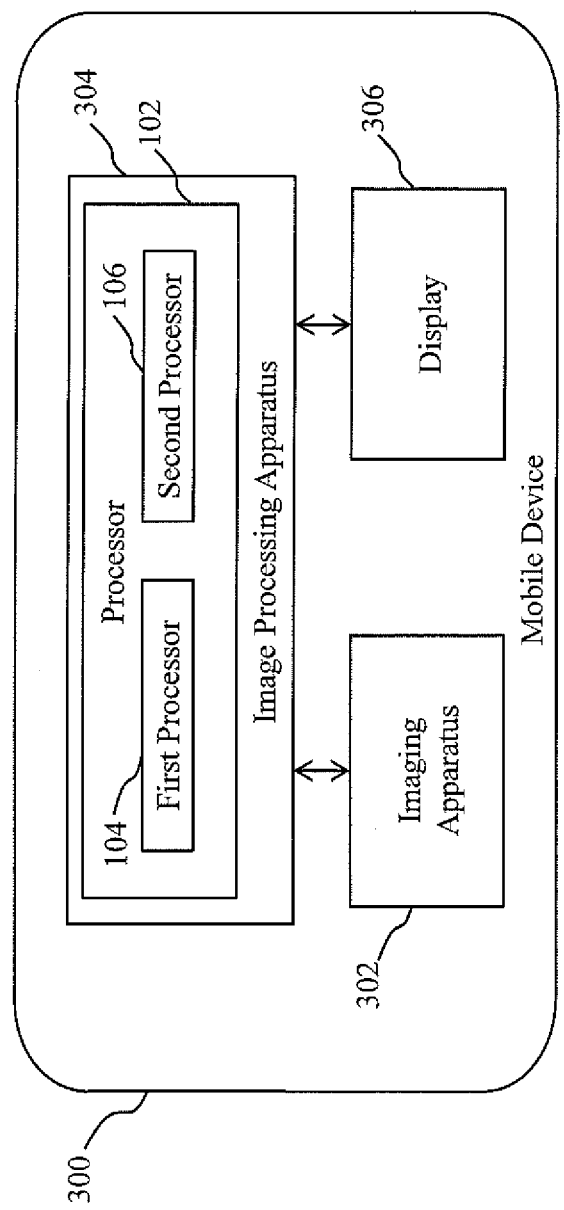
FIG. 3 is a functional block diagram of a device configured for secure biometric recognition.

FIG. 3 is a functional block diagram of a device 300 configured for secure biometric recognition, comprising an imaging apparatus 302, an image processing apparatus 304 and a display 306. Image processing apparatus 304 comprises processor 102 (see FIG. 1)—which processor 102 is configured to implement a high security operating environment and a normal security operating environment, each isolated from the other. Images processed by image processing apparatus 304 may in an embodiment be transmitted to display 306 for display to a user or operator of the imaging apparatus or biometric device.

In operation, imaging apparatus 302 acquires an image of the biometric feature of interest and transmits the image to image processing apparatus 304. The image captured by imaging apparatus 302 may be a still image or a video image. Image processing apparatus 304 may thereafter analyse the acquired image frame(s) and compare the corresponding digital feature set with digital templates encoded and stored based on previously acquired images of biometric features, to identify the subject, or to verify the identity of the subject.

Device 300 may include other components not illustrated in FIG. 3, including components for extracting still frames from video images, for processing and digitizing image data, for enrolment of biometric features (the process of capturing, and storing information describing biometric features or identifiers for a subject, and associating the stored information with that subject) and comparison (the process of comparing biometric feature information acquired from a subject against information previously acquired during enrolment, for identification or verification of the subject's identity), and for enabling communication between components of device 300. The imaging apparatus, image processing apparatus and other components of device 300 may comprise independent or separate devices, or may be combined within a single device.

Figure 4:
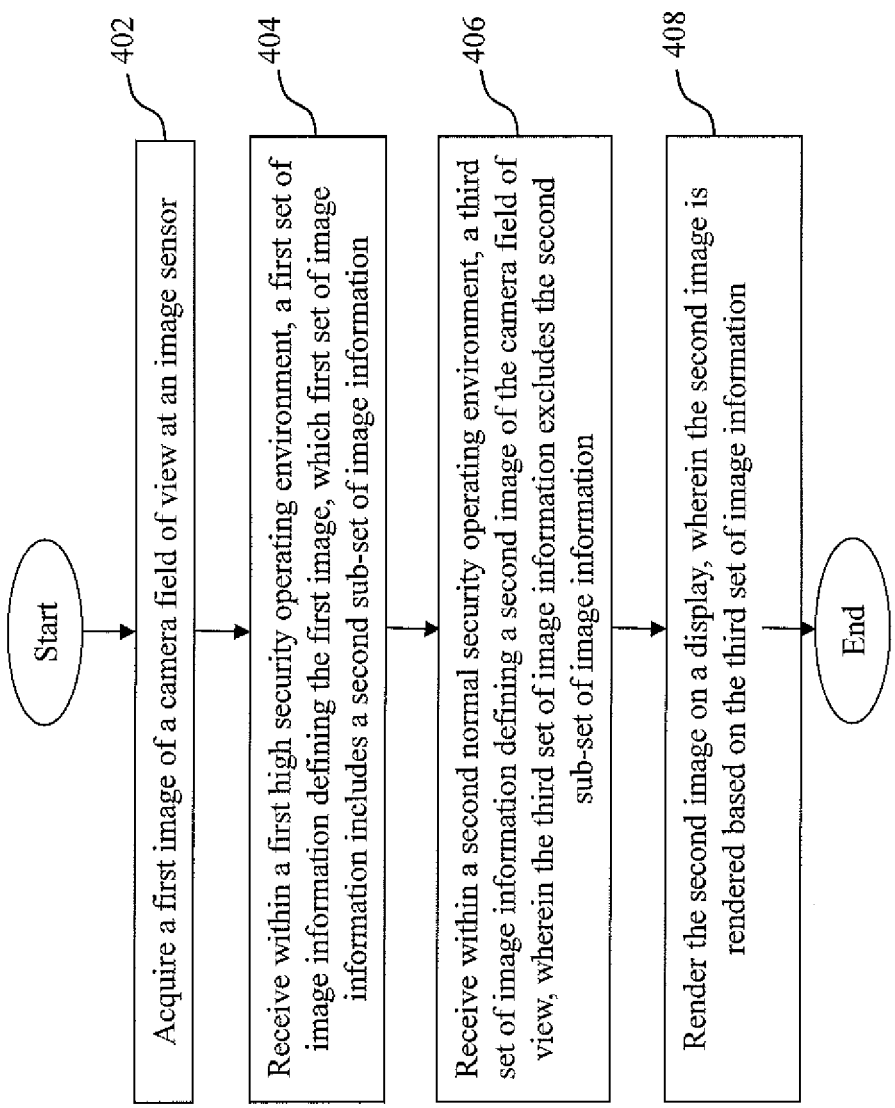
FIGS. 4 and 5 illustrate methods for ensuring security of biometric information within a device of the type illustrated in FIG. 3.

FIG. 4 illustrates a method according to the present invention, for ensuring security of biometric information, within a device of the type illustrated in FIG. 3.

Step 402 of FIG. 4 comprises acquiring a first image of a camera field of view. The first image may be acquired at a camera image sensor. At step 404, a first set of image information defining the first image is received within a first high security operating environment within an image processing apparatus. The first set of image information may be communicated from the camera image sensor to the first high security operating environment. In another embodiment, an image processor controlling the camera image sensor may be part of the first high security operating environment, and image information defining the image acquired by the camera image sensor may be parsed by said image processor.

The first set of image information received at step 404 includes a second sub-set of image information, which second sub-set of image information enables or is relevant for biometric feature extraction or biometric feature recognition. In an embodiment, the second sub-set of image information may include information which enables or is relevant for recording or rendering image texture information acquired by the camera image sensor and that enables or is relevant for eye, iris, eye vein, periocular, retina or facial feature based biometric feature extraction or biometric image recognition.

Step 406 comprises receiving within a second normal security operating environment of the image processing apparatus, a third set of image information defining a second image of the camera field of view, wherein the third set of image information excludes the second sub-set of image information.

By ensuring that the second sub-set of image information (which enables or is relevant for biometric feature extraction or for biometric feature recognition) is excluded from the image information received within the second normal security operating environment (and is accessible only within the first high security operating environment), the method ensures that information which enables or is relevant for biometric feature extraction or biometric feature recognition is protected from attempts to misappropriate, and from software attacks.

Step 408 subsequently renders the second image on a display device (such as for example mobile device display or any other electronic display device). Since the second image is an image of the camera field of view, said second image may be used by a user or an operator as visual feedback to enable positioning of a biometric feature of interest (e.g. a subject's eye, iris, retina or face) within the camera's field of view.

Additionally, since the second image is defined by the third set of information, it correspondingly excludes the second sub-set of information that enables or is relevant for biometric feature extraction or biometric feature recognition. Step 408 accordingly ensures that the displayed second image cannot be used for misappropriating information that is relevant for biometric feature extraction or biometric feature recognition—for example by photography or video acquisition of an image rendered on the display.

It would be understood that the step of generating a third set of image information defining a second image of the camera field of view can be achieved in multiple ways.

Figure 5:
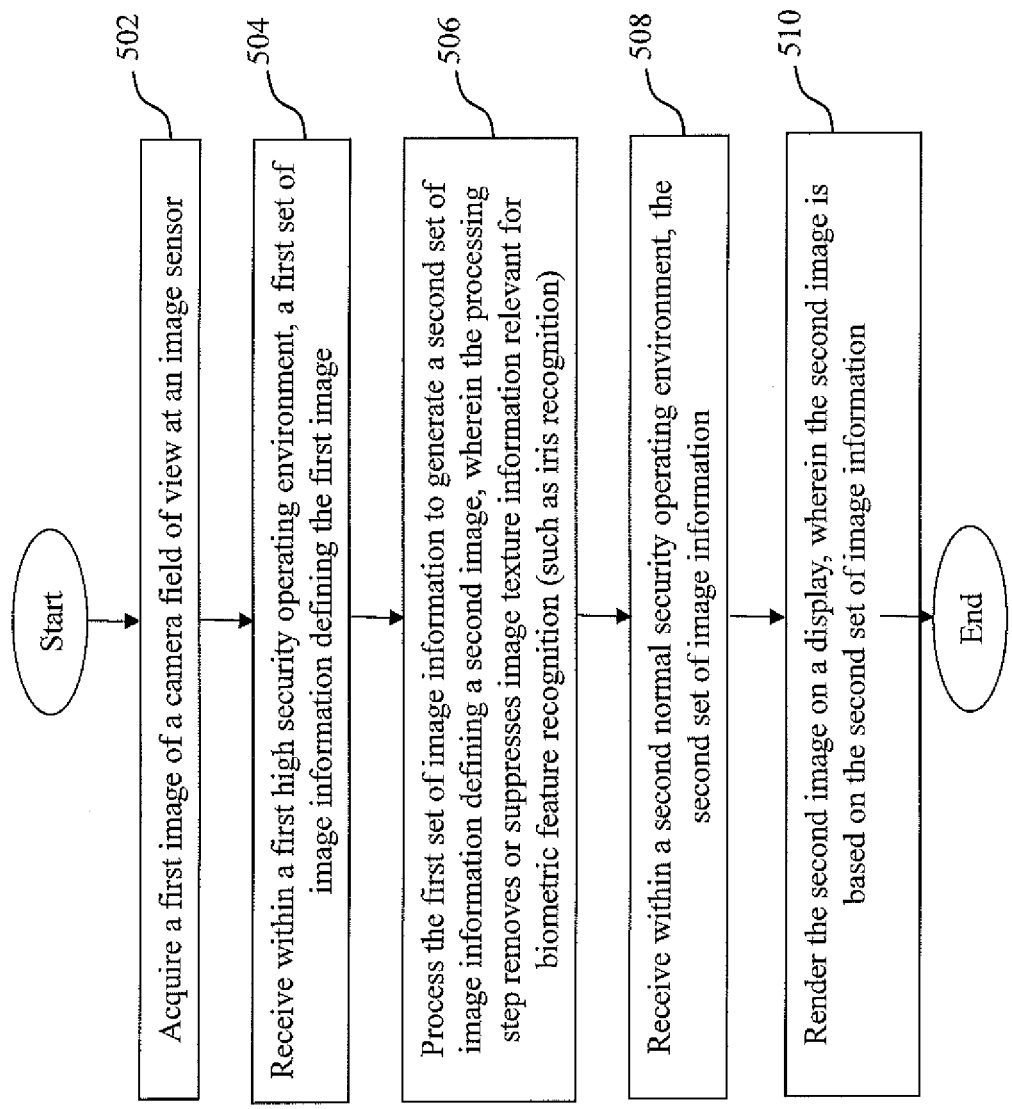

FIG. 5 illustrates a specific embodiment of the method illustrated in FIG. 4, wherein a third set of information and a corresponding second image of the camera field of view are generated by applying image processing techniques to the first set of information defining the first image of the camera field of view. As discussed below, appropriate image processing techniques may be selected to ensure that the third set of information and corresponding second image exclude information relevant for biometric feature extraction or biometric feature recognition.

At step 502, a first image of a camera field of view is acquired at an image sensor. Step 504 comprises receiving a first set of image information defining the first image, within a first high security operating environment of the image processing apparatus.

Step 506 comprises processing the first set of image information, to generate a second set of image information defining a second image of the camera field of view. The processing step of step 506 removes, suppresses or otherwise alters image texture or image feature information that enables or is relevant for biometric feature extraction or biometric image recognition. In an embodiment of the invention, the processing step of 506 removes, suppresses or otherwise alters image texture or image feature information that enables or is relevant for eye, iris, eye vien, periocular, retina or facial feature based biometric feature extraction or biometric image recognition.

In an embodiment of the method, image processing step 506 removes from the first set of image information all or part of image texture or image feature information that enables or is relevant for biometric feature extraction or biometric feature recognition, to generate the second set of image information. Image processing step 506 may be implemented entirely within the first high security operating environment to ensure that: (i) the first image of the camera field of view (ii) the first set of image information defining said first image and (iii) image texture information that enables or is relevant to biometric feature extraction or biometric feature recognition—are not communicated to or otherwise accessible outside of the first high security operating environment.

Step 508 comprises receiving within the second normal security operating environment of the image processing apparatus, the generated second set of image information. Based on the generated second set of image information, step 510 renders a corresponding second image on a display. Since the second set of information and corresponding second image excludes image texture or image feature information that enables or is relevant for biometric feature extraction or biometric feature recognition, sensitive information remains protected despite the second set of image information and the second image being exposed to the normal security operating environment and/or a display device.

Image processing at step 506 may include processing in accordance with any one or more image processing techniques selected to ensure that the second set of image information and corresponding second image excludes information relevant for biometric feature extraction or biometric feature recognition. Relevant image processing techniques may include any one or more digital filters or image processing functions selected to ensure that at least a part of image texture or image feature information which enables or is relevant for biometric feature extraction or biometric feature recognition from the first image is "filtered out" or is appropriately suppressed or altered when generating the second image.

Exemplary filters or functions that may be configured for pixelating, blurring, diffusing, embossing, extruding, fragmenting, lens-flaring, pointillizing, solarizing, tilting, crystalizing, faceting, rippling, shearing, spherizing, shading, re-coloring, de-coloring, distorting, magnifying, crazing introducing droplet effects, introducing mosaic patterns, twirling effects, wave effects, or zigzagging.

In a particular embodiment, the first image or corresponding first set of image information is subjected to one or more of (i) a sketching filter—which generates a sketch of the acquired first image (for example, using edge detection algorithms) (ii) a cartoonizing filter—which combines edge detection algorithms with a predefined (and preferably primitive) color quantization algorithm, (iii) a cartoonizing bilateral filter—which may use both local special and range information to blur the image but preserve edges, (iv) image conversion filters—which apply a predefined set of rules to vary one or more of color, texture and brightness of pixels within an image, which variation is responsive to the detected original color, texture and brightness of pixels and (v) "painting" filters—which divide a digital image into a plurality of working regions, and apply a predefined or selected painting effect to pixels within each working region. By applying appropriate filters or functions to the first image, image processing step 506 ensures at least some part of image texture information that enables or is relevant to biometric feature extraction or biometric feature recognition is obscured, suppressed, omitted or excluded in the second image and corresponding second set of image information.

Figure 6A:
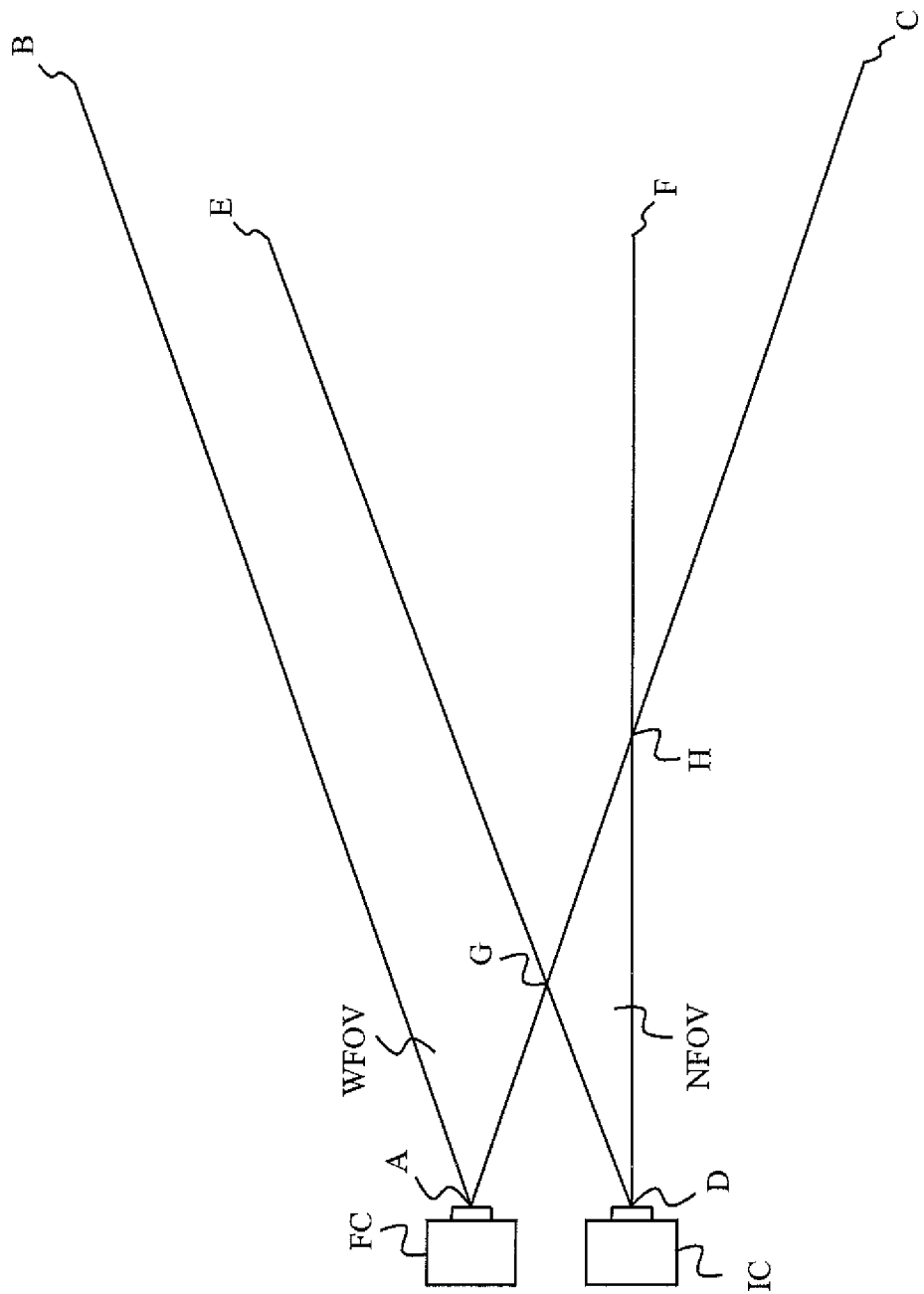
FIGS. 6A, 6B and 8B illustrate imaging apparatuses in accordance with the present invention.
Figure 6B:
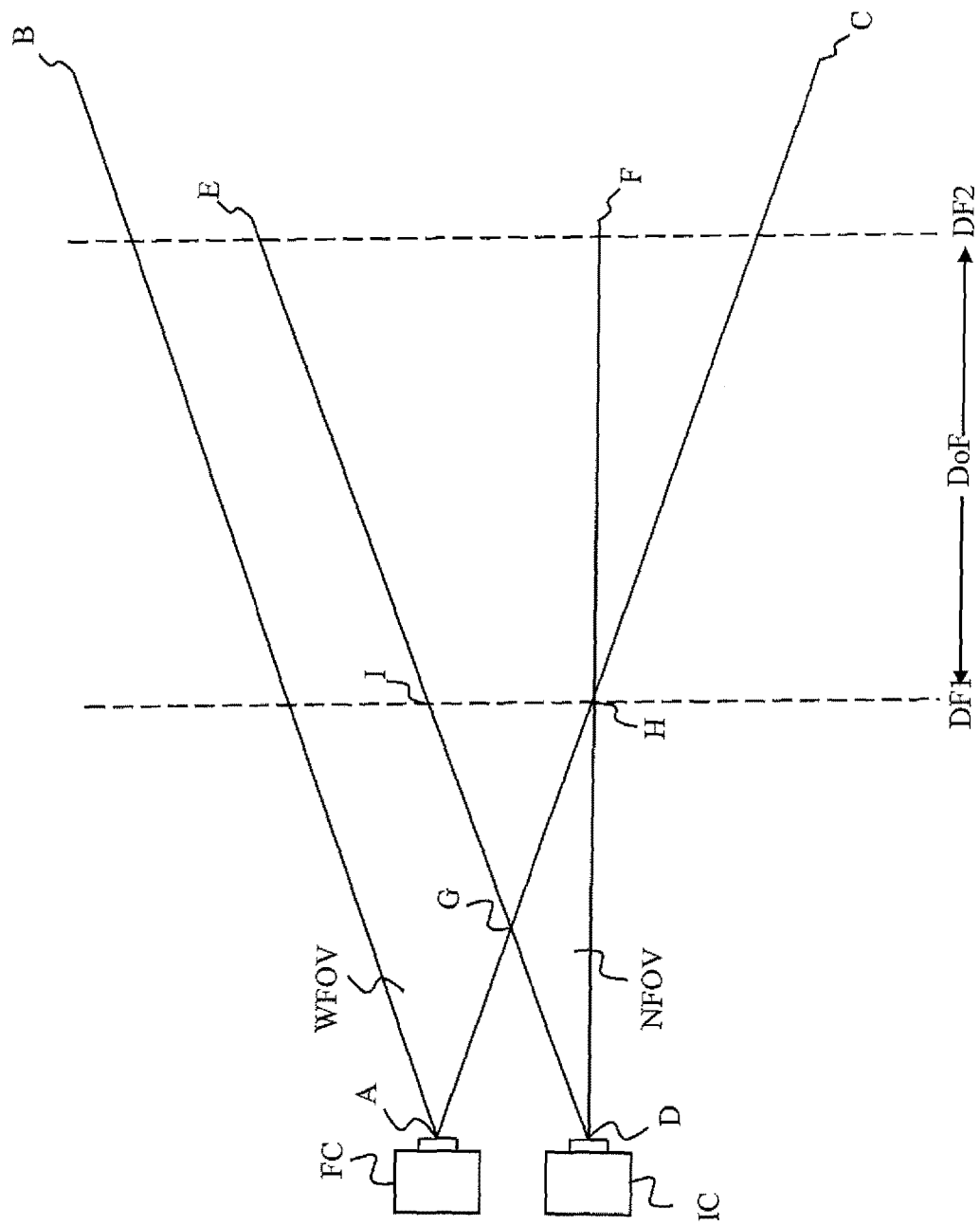

FIGS. 6A and 6B illustrate imaging apparatuses configured to implement an alternative embodiment of the method more generally described in connection with FIG. 4. The imaging apparatus of FIG. 6A illustrates a dual camera arrangement comprising biometric camera IC and feedback camera FC. Field of view of biometric camera IC comprises the region within lines DE and DF, while field of view of feedback camera FC comprises the region within lines AB and AC. The biometric camera IC and feedback camera FC are configured and positioned such that field of view of biometric camera IC falls substantially (or entirely) within field of view of feedback camera FC. In an embodiment of the invention, biometric camera IC may be configured to have a narrow field of view (NFOV) while feedback camera FC may be configured to have a wide field of view (WFOV). This configuration enables the two cameras to be positioned relative to each other such that the narrow field of view NFOV of biometric camera IC is located substantially (or entirely) within the wide field of view WFOV of feedback camera FC. As illustrated in FIG. 6A, excluding region DGH, the remaining area within narrow field of view NFOV of biometric camera IC is located within wide field of view WFOV of feedback camera FC.

The respective configurations of biometric camera IC and feedback camera FC are selected to provide differing imaging abilities, such that biometric camera IC has improved biometric imaging characteristics in comparison to feedback camera FC. In an embodiment, biometric camera IC is configured to acquire a set of image texture information characteristics that feedback camera FC is (i) incapable of acquiring or (ii) configured to exclude or omit during image acquisition—which image texture or image feature information characteristics enable or are relevant to biometric feature extraction or biometric feature recognition (such as for example, feature extraction or recognition based on eye, iris, eye vein, perocular, retina or facial characteristics. In an embodiment, the difference in imaging ability between biometric camera IC and feedback camera FC may be achieved in terms of differences in one or more of pixel resolution, depth of focus, optical assemblies, and optical filters.

In a particular embodiment that is advantageous for iris or eye or face based biometric systems, feedback camera FC may be provided with an IR cut filter or other appropriate optical filter, configured to prevent the corresponding image sensor from detecting infrared wavelengths and/or near infrared wavelengths, while biometric camera IC may be configured to detect and image objects based on wavelengths within the infrared or near infrared spectrum. Since wavelengths within the infrared or near infrared spectrum have been found to be particularly effective in conveying biometric information, the IR cut filter disposed on feedback camera FC ensures that the image acquired by feedback camera FC does not include corresponding biometric information conveyed within the infrared or near infrared spectrum, whereas the same biometric information may be acquired by biometric camera IC based on detected radiations within the infrared or near infrared wavelength.

Since biometric camera IC and feedback camera FC have overlapping fields of view, both imaging apparatuses would capture images of a biometric feature of interest that is positioned within a region defined by the overlapping fields of view. However as a consequence of their differing configurations, in imaging a biometric feature of interest positioned within the overlapping fields of view, biometric camera IC would detect and acquire more image texture information that enables or is relevant to biometric feature extraction or biometric feature recognition, when compared with the image texture information detected and acquire by feedback camera FC. In an embodiment of the invention, feedback camera FC may be configured to exclude or omit acquisition of certain image texture information that enables or is relevant to biometric feature extraction or biometric feature recognition, which image texture information is simultaneously acquired by biometric camera IC.

FIG. 6B illustrates a more particular embodiment of the imaging apparatus generally illustrated in FIG. 6A, wherein biometric camera IC has a depth of field DOF—which depth of field DOF defines the region within which an object would appear acceptably sharp and in sufficient detail for the purposes of image capture for the purpose of biometric feature extraction or recognition. Positioning a biometric feature of interest within an intersection region of the camera's field of view and depth of field ensures that the resulting image of the biometric feature of interest is likely to be acceptable or optimal for biometric recognition or authentication purposes. In FIG. 6B, depth of field DOF of biometric camera IC is identified as the region between dashed lines Df1 and Df2, and the intersection between the depth of field DOF and biometric camera field of view is defined by region HIEF. Positioning of a biometric feature of interest within region HIEF would ensure that an image of the biometric feature of interest that is acquired by biometric camera IC would be of sufficient image quality for the purposes of biometric feature capture and recognition.

It will be noted from FIG. 6B that the dual camera arrangement is configured such that the intersection region HIEF (i.e. the region within which a biometric feature of interest requires to be positioned for optimal image capture) falls entirely within the boundaries of the wide field of view WFOV of feedback camera FC.

Figure 7:
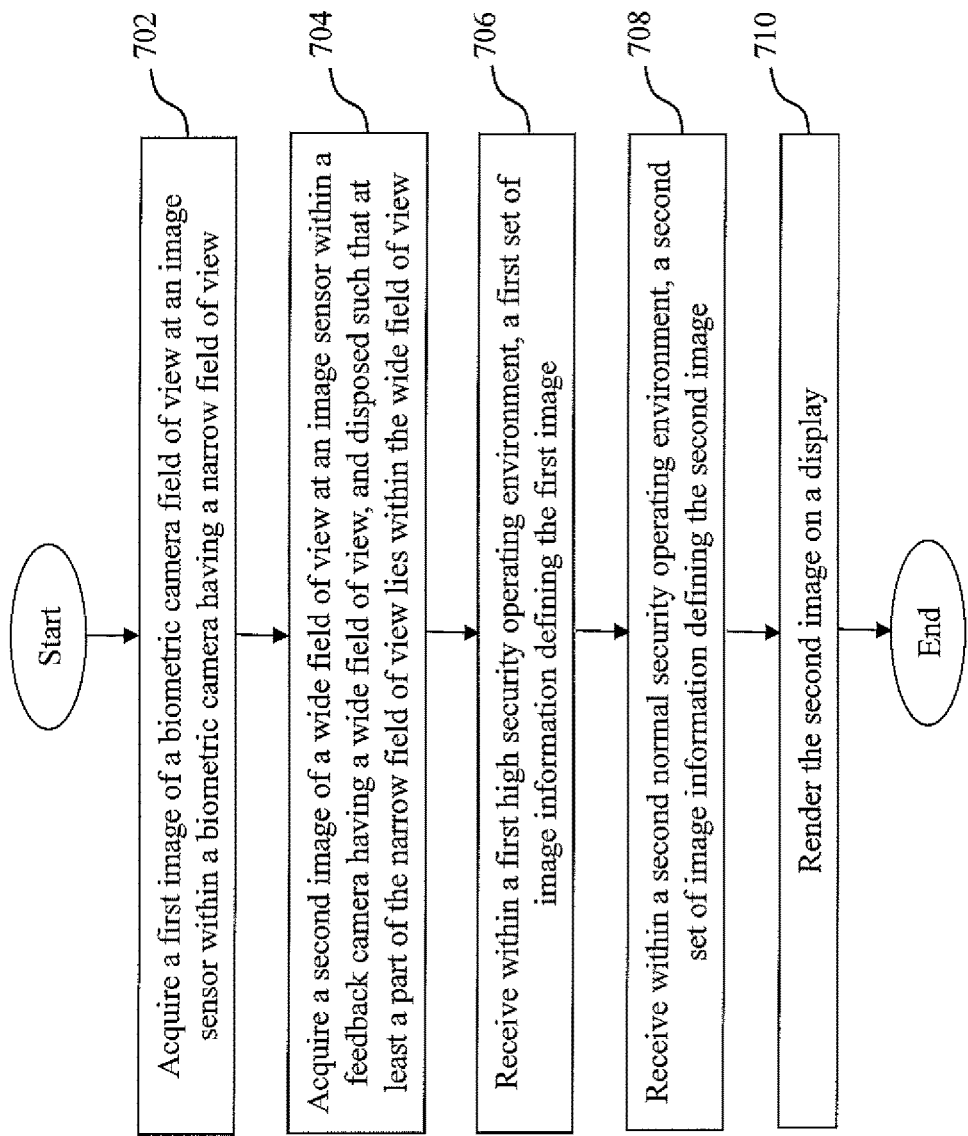
FIGS. 7 and 8A illustrates a method of image acquisition and image processing.

FIG. 7 illustrates a method of image acquisition and image processing that may be implemented on an imaging apparatus as illustrated in any one of FIGS. 6A or 6B.

Step 702 comprises acquiring a first image of a camera field of view at an image sensor within biometric camera IC. As illustrated in FIGS. 6A and 6B, biometric camera IC has a narrow field of view NFOV (defined by lines DE and DF). Step 704 comprises acquiring a second image of a wide field of view WFOV (defined by lines AB and AC in FIGS. 6A and 6B) at an image sensor within feedback camera FC—wherein biometric camera IC and feedback camera FC are respectively configured and arranged such that at least a part of the narrow field of view NFOV corresponding to biometric camera IC is located within the wide field of view WFOV corresponding to feedback camera FC.

Step 706 comprises receiving within a first high security operating environment of the image processing apparatus, a first set of information defining the first image acquired by the biometric camera. At step 708, a second set of image information defining the second image acquired by the feedback camera is received within a normal security operating environment of the image processing apparatus. Step 710 thereafter comprises rendering the second image on a display.

The first image (and corresponding first set of image information) acquired by the biometric camera IC is received and processed entirely within the first high security operating environment to ensure that (i) the first image of the biometric camera field of view (ii) the first set of image information defining said first image of the biometric camera field of view and (iii) image texture or image feature information that enables or is relevant to biometric feature extraction or biometric feature recognition, are not communicated to or otherwise accessible outside of the first high security operating environment.

Further, since feedback camera FC is configured such that since the acquired second image excludes image texture or image feature information that enables or is relevant for biometric feature extraction or biometric feature recognition (as discussed in connection with FIGS. 6A and 6B), sensitive image texture or image geature information remains isolated from the risk of software attacks and misappropriation threats, despite the second set of image information and the second image being exposed to the lower security offered by the normal security operating environment and/or display devices.

It would be understood that the dual camera arrangement described in FIGS. 6A to 7 may be configured to ensure that the intended region for positioning a biometric feature of interest during image capture is imaged simultaneously (or substantially simultaneously) or over a predefined time interval by biometric camera IC and feedback camera FC. Since the biometric camera IC is configured to acquire image texture information that that enables or is relevant for biometric feature extraction or biometric feature recognition, image information acquired by the biometric camera image sensor corresponding to this intended region for biometric feature capture is communicated to and isolated within the high security operating environment of the image processing apparatus. Since the feedback camera FC is configured to simultaneously acquire image information corresponding to the intended region for biometric feature capture, but which image information excludes (or omits) sensitive texture or feature information, such image information may be communicated from the feedback camera to the normal security operating environment of the image processing apparatus and may be displayed to assist a subject in correctly positioning their biometric modality (e.g., one of both eyes) relative to the biometric camera IC.

Figure 8A:
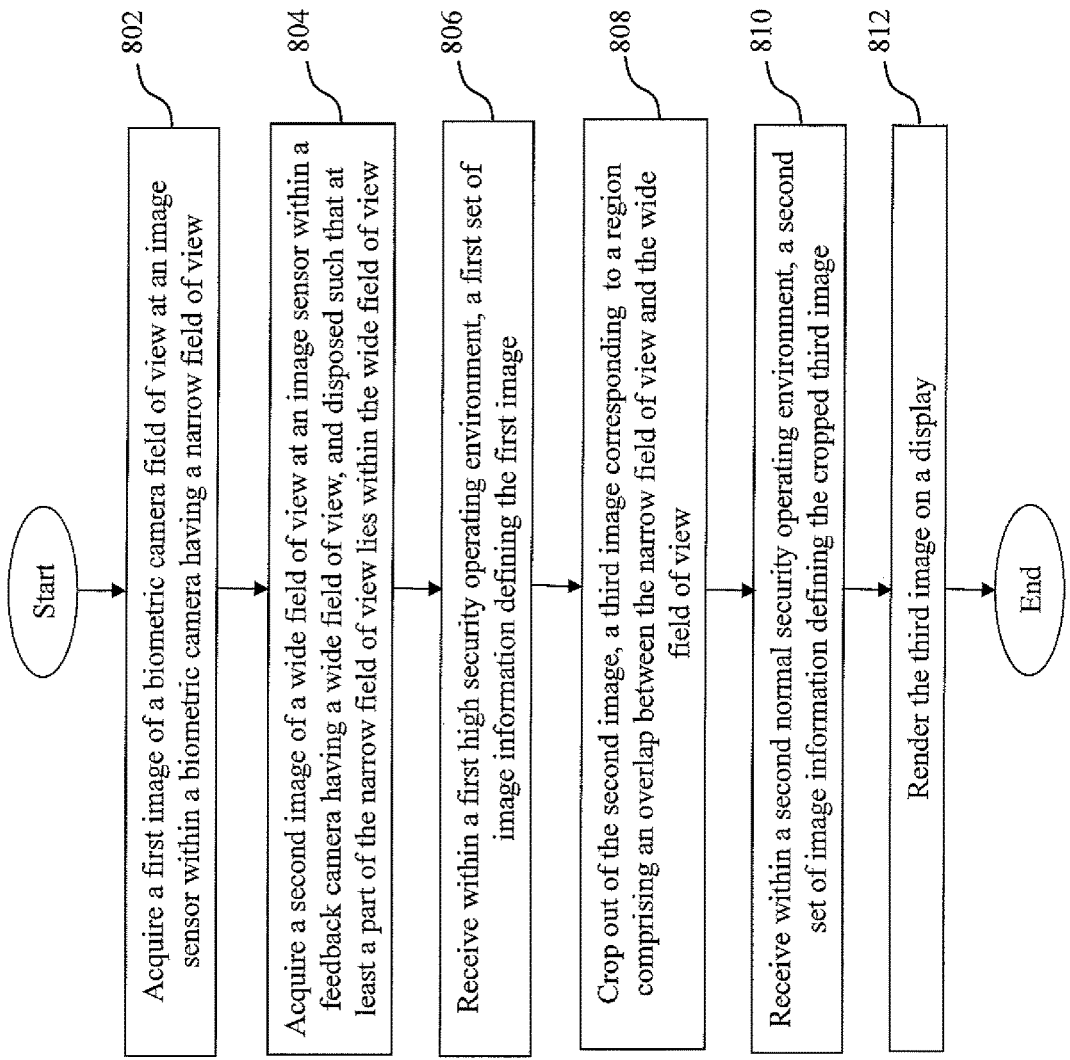
Figure 8B:
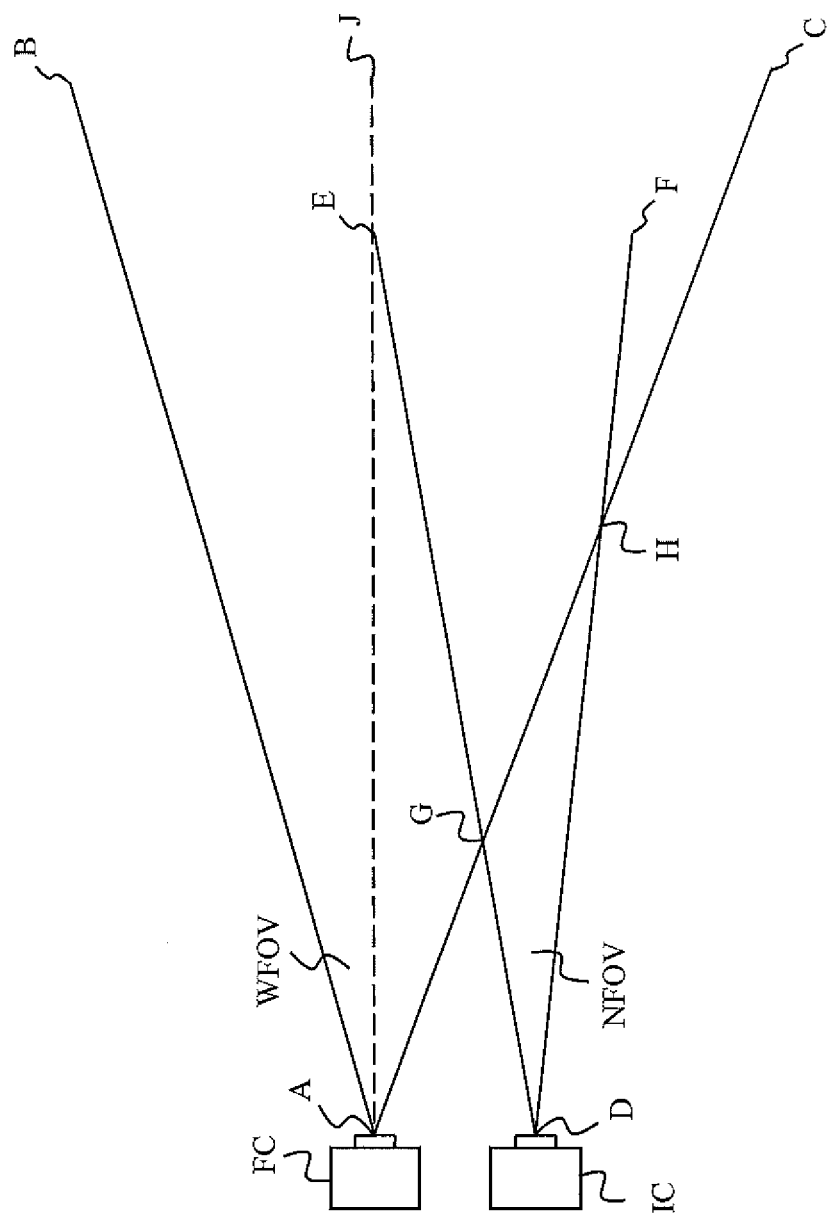

FIGS. 8A and 8B disclose preferred method and apparatus embodiments of the invention more generally discussed above in connection with FIGS. 6A, 6B and 7.

Step 802 of FIG. 8A comprises acquiring a first image of a biometric camera field of view at an image sensor within biometric camera IC having narrow field of view NFOV.

Step 804 comprises acquiring a second image of a wide field of view WFOV at an image sensor within feedback camera FC—wherein biometric camera IC and feedback camera FC are respectively configured and arranged such that at least a part of the narrow field of view NFOV corresponding to biometric camera IC is located within the wide field of view WFOV corresponding to the feedback camera FC.

Step 806 comprises receiving within a first high security operating environment of the image processing apparatus, a first set of information defining the first image acquired by the biometric camera.

At step 808 a third image is cropped out of the second image, which third image includes a region comprising a part of the overlap (or the entire overlap) between the narrow field of view NFOV and the wide field of view WFOV. In the apparatus embodiment illustrated in FIG. 8B, the cropped third image corresponds to region defined by lines AJ and AC, which region includes therewithin the entire overlap between narrow field of view NFOV and wide field of view WFOV. Cropping of the third image out of the second image may be achieved in any number of ways and using any image cropping algorithms or functions. In an embodiment, cropping of the third image may be achieved by communicating the second image to one of the first high security operating environment and the second normal security operating environment, and subjecting it to a cropping algorithm or function. In another embodiment, cropping of the third image may be achieved by selectively parsing image sensor pixels within the feedback camera image sensor such that the resulting image is based solely on pixels corresponding to the image region defined by the overlap of narrow field of view NFOV (of biometric camera IC) and wide field of view WFOV (of feedback camera FC).

At step 810, a second set of image information defining the cropped third image is received within the normal security operating environment of the image processing apparatus. Step 812 thereafter comprises rendering the cropped third image on a display.

As discussed above, the first image (and corresponding first set of image information) acquired by the biometric camera IC is received and processed entirely within the first high security operating environment to ensure that (i) the first image of the biometric camera field of view (ii) the first set of image information defining said first image of the biometric camera field of view and (iii) image texture or image feature information that enables or is relevant to biometric feature extraction or biometric feature recognition, are not communicated to or otherwise accessible outside of the first high security operating environment.

Since the second image acquired by feedback camera FC excludes or omits image texture or image feature information that enables or is relevant for biometric feature extraction or biometric feature recognition, the correspondingly cropped third image also necessarily excludes or omits such image texture or image feature information. In communicating the cropped third image to the normal security operating environment and/or to a display device, sensitive image texture or image feature information therefore remains isolated from the risk of software attacks and misappropriation threats.

By displaying a cropped image corresponding to the overlap between the narrow field of view NFOV of biometric camera IC and the wide field of view WFOV of feedback camera FC, the embodiment provides an operator with real time feedback regarding position of a biometric feature of interest, relative to the biometric camera IC.

In embodiments of the apparatus respectively discussed in connection with FIGS. 6A to 8B where the imaging apparatus is disposed within a mobile device, biometric camera IC may be a dedicated biometric camera configured for biometric feature acquisition and having a corresponding narrow field of view NFOV, while a regular mobile device camera (such as a front facing or rear facing mobile device camera) having a wide field of view WFOV may serve as a feedback camera. It will also be understood that while the biometric camera and feedback camera in FIGS. 6A to 8B have been discussed in terms of a narrow field of view and a wide field of view respectively, the inventive configurations may equally accommodate other configurations for the respective fields of view, provided there is an overlapping between the two fields of view.

Figure 9:
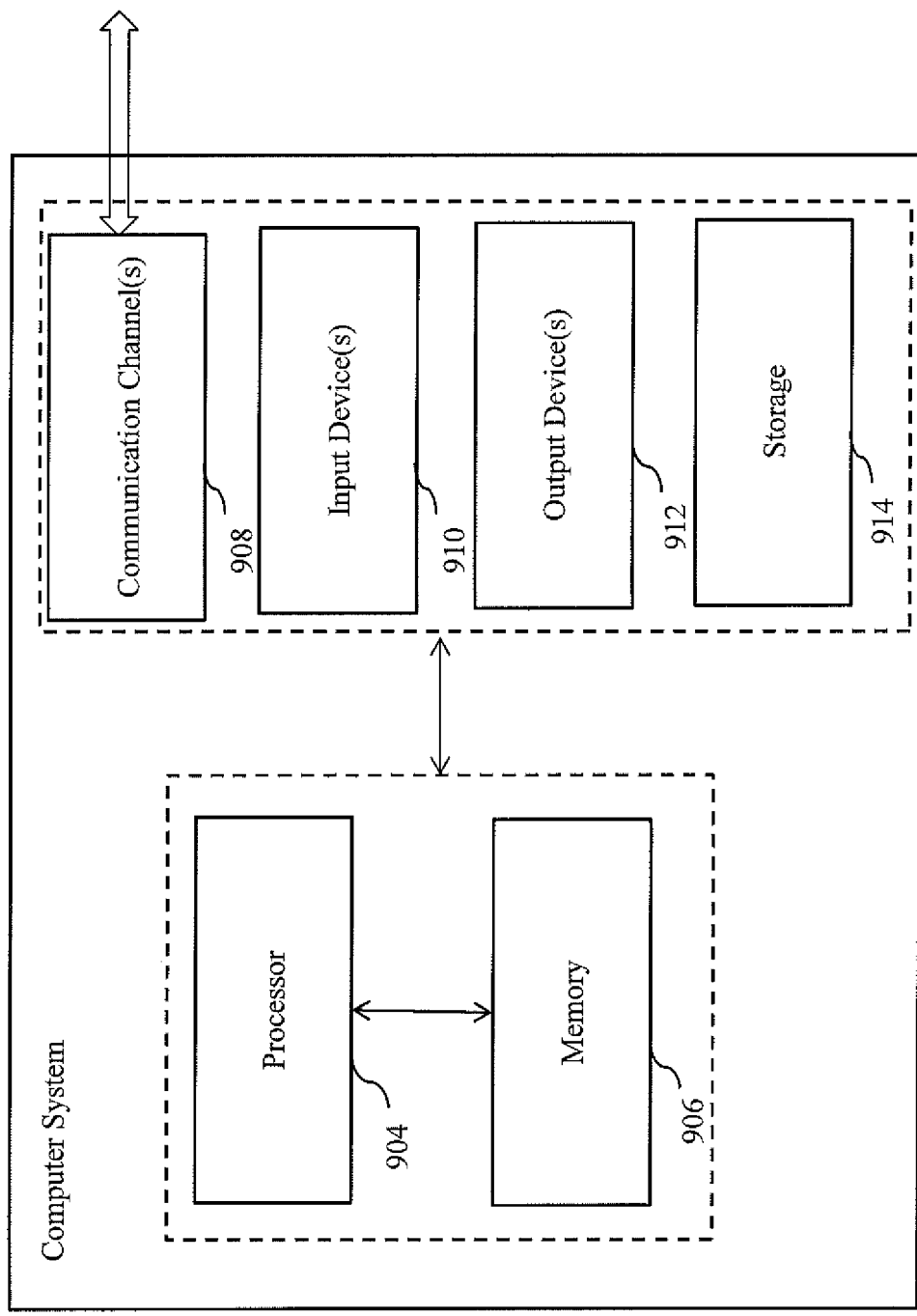
FIG. 9 illustrates an exemplary system in accordance with the present invention.

FIG. 9 illustrates an exemplary system in which various embodiments of the invention, including of the imaging apparatus, image processing apparatus and display, may be implemented.

The system 902 comprises at-least one processor 904 and at-least one memory 906. The processor 904 executes program instructions and may be a real processor. The processor 904 may also be a virtual processor. The computer system 902 is not intended to suggest any limitation as to scope of use or functionality of described embodiments. For example, the computer system 902 may include, but not limited to, one or more of a general-purpose computer, a programmed microprocessor, a micro-controller, an integrated circuit, and other devices or arrangements of devices that are capable of implementing the steps that constitute the method of the present invention. In an embodiment of the present invention, the memory 906 may store software for implementing various embodiments of the present invention. The computer system 902 may have additional components. For example, the computer system 902 includes one or more communication channels 908, one or more input devices 910, one or more output devices 912, and storage 914. An interconnection mechanism (not shown) such as a bus, controller, or network, interconnects the components of the computer system 902. In various embodiments of the present invention, operating system software (not shown) provides an operating environment for various softwares executing in the computer system 902, and manages different functionalities of the components of the computer system 902.

The communication channel(s) 908 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 910 may include, but not limited to, a touch screen, a keyboard, mouse, pen, joystick, trackball, a voice device, a scanning device, or any another device that is capable of providing input to the computer system 902. In an embodiment of the present invention, the input device(s) 910 may be a sound card or similar device that accepts audio input in analog or digital form. The output device(s) 912 may include, but not limited to, a user interface on CRT or LCD, printer, speaker, CD/DVD writer, or any other device that provides output from the computer system 902.

The storage 914 may include, but not limited to, magnetic disks, magnetic tapes, CD-ROMs, CD-RWs, DVDs, any types of computer memory, magnetic stipes, smart cards, printed barcodes or any other transitory or non-transitory medium which can be used to store information and can be accessed by the computer system 902. In various embodiments of the present invention, the storage 914 contains program instructions for implementing the described embodiments.

While not illustrated in FIG. 9, the system of FIG. 9 may further include some or all of the components of an imaging apparatus of the type more fully described in connection with FIG. 3 hereinabove.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 902. The method described herein is typically implemented as a computer program product, comprising a set of program instructions which is executed by the computer system 902 or any other similar device. The set of program instructions may be a series of computer readable codes stored on a tangible medium, such as a computer readable storage medium (storage 914), for example, diskette, CD-ROM, ROM, flash drives or hard disk, or transmittable to the computer system 902, via a modem or other interface device, over either a tangible medium, including but not limited to optical or analogue communications channel(s)

908. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method for secure processing of an imaged biometric characteristic comprising:
    acquiring a first image of a first field of view corresponding to a biometric camera;
    receiving at a processor implemented first high security operating environment, a first set of image information defining the first image including biometric characteristic information, wherein the first set of image information includes a second sub-set of image information relevant for biometric characteristic extraction or comparison;
    rendering on a display, a second image of the first field of view corresponding to the biometric camera, wherein the step of rendering the second image on the display is implemented at a processor implemented second normal security operating environment;
    wherein:
        the second image is defined by a third set of image information, such that the third set of information excludes the second sub-set of image information;
        the first high security operating environment implements enhanced processor and memory access restrictions in comparison with the second normal security operating environment;
        generating the third set of image information comprises applying at least one image processing function to the first set of image information to remove the biometric characteristic information from the first set of image information, wherein application of the at least one image processing function and generation of the third set of image information is implemented entirely within the first high security operating environment;
        the third set of image information generated within the first high security operating environment is received at the second normal security operating environment, for rendering the second image on the display; and
        the second sub-set of image information is excluded from image information received at the second normal security operating environment.

2. The method of claim 1, wherein responsive to a part of an imaged biometric characteristic being positioned within the first field of view corresponding to the biometric camera, the second image rendered on the display includes an image of said part of the imaged biometric characteristic within the first field of view.

3. A system for secure processing of an imaged biometric characteristic comprising:
    a biometric camera configured to acquire a first image of a first field of view corresponding to the biometric camera;
    one or more processors configured to:
    implement a first high security operating environment and a second normal security operating environment;
    receive at the first high security operating environment, a first set of image information defining the first image including biometric characteristic information, wherein the first set of image information includes a second sub-set of image information relevant for biometric characteristic extraction or comparison;
    a display configured for rendering a second image of the first field of view corresponding to the biometric camera, wherein rendering the second image on the display is implemented at a processor implemented second normal security operating environment;
    wherein:
        the second image is defined by a third set of image information, such that the third set of information excludes the second sub-set of image information;
        the first high security operating environment implements enhanced processor and memory access restrictions in comparison with the second normal security operating environment;
        generating the third set of image information comprises applying at least one image processing function to the first set of image information to remove the biometric characteristic information from the first set of image information, wherein application of the at least one image processing function and generation of the third set of image information is implemented entirely within the first high security operating environment;
        the third set of image information generated within the first high security operating environment is received at the second normal security operating environment, for rendering the second image on the display; and
        the second sub-set of image information is excluded from image information received at the second normal security operating environment.

4. A computer program product for secure processing of an imaged biometric characteristic, comprising a non-transitory computer usable medium having a computer readable program code embodied therein, the computer readable program code comprising instructions for:
    acquiring a first image of a first field of view corresponding to a biometric camera;
    receiving at a processor implemented first high security operating environment, a first set of image information defining the first image including biometric characteristic information, wherein the first set of image information includes a second sub-set of image information relevant for biometric characteristic extraction or comparison;
    rendering on a display, a second image of the first field of view corresponding to the biometric camera, wherein the step of rendering the second image on the display is implemented at a processor implemented second normal security operating environment;
    wherein:
        the second image is defined by a third set of image information, such that the third set of information excludes the second sub-set of image information;
        the first high security operating environment implements enhanced processor and memory access restrictions in comparison with the second normal security operating environment;

generating the third set of image information comprises applying at least one image processing function to the first set of image information to remove the biometric characteristic information from the first set of image information, wherein application of the at least one image processing function and generation of the third set of image information is implemented entirely within the first high security operating environment;

the third set of image information generated within the first high security operating environment is received at the second normal security operating environment, for rendering the second image on the display; and the second sub-set of image information is excluded from image information received at the second normal security operating environment.

* * * * *